United States Patent Office 3,540,887
Patented Nov. 17, 1970

3,540,887
LIGHT-SENSITIVE ELEMENT CONTAINING FILTER DYE
Henri Depoorter, Mortsel, and Guy Alfred Rillaers and Theofiel Hubert Ghys, Kontich, Belgium, assignors to Gevaert-Agfa N.V., Mortsel, Belgium, a company of Belgium
Filed May 31, 1968, Ser. No. 733,358
Claims priority, application Great Britain, June 16, 1967, 27,911/67
Int. Cl. G03c *1/84*
U.S. Cl. 96—84                                    6 Claims

ABSTRACT OF THE DISCLOSURE

A light-sensitive element comprising a support and a water-permeable colloid layer including a light-sensitive silver halide emulsion and a dye corresponding to the formula:

Figure 1:
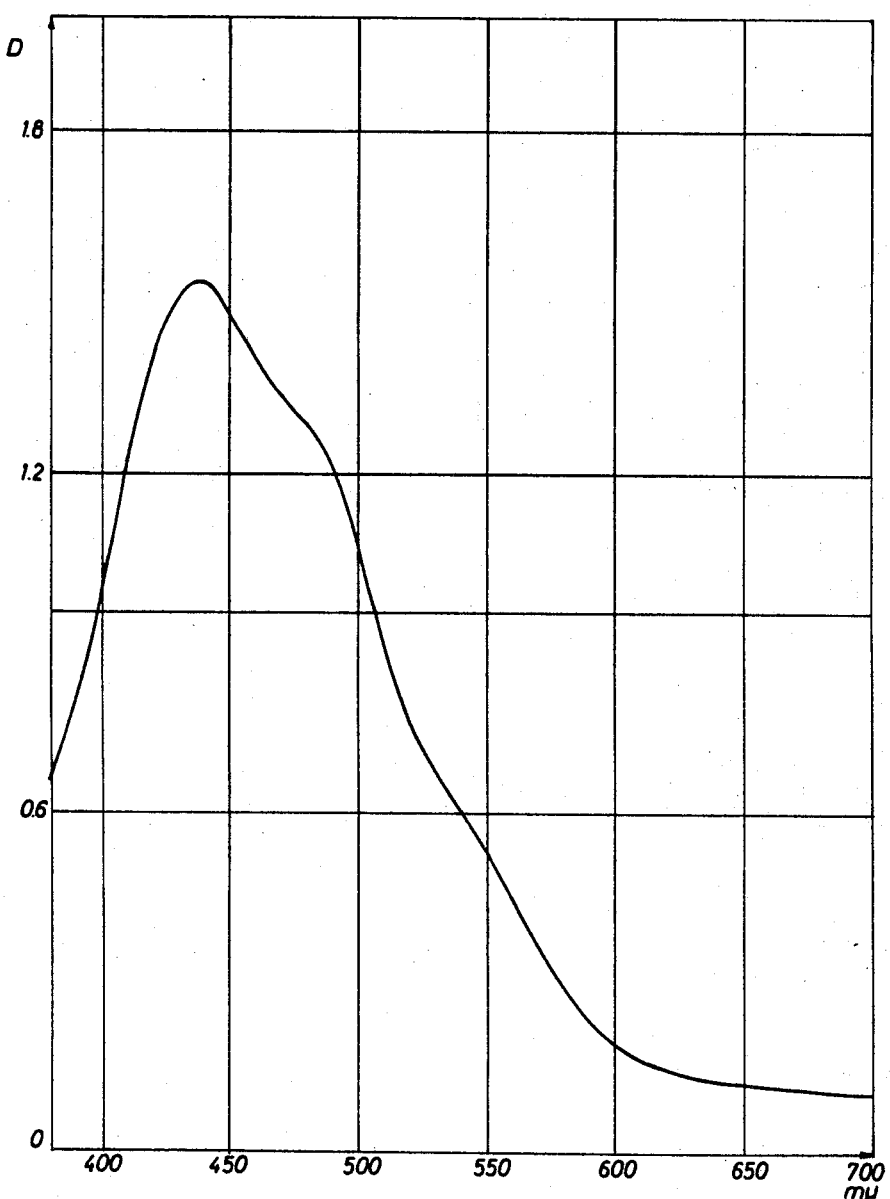

$$X-(CH_2)_n\diagdown N-Ar(-L_3=L_2)_{p-1}-L_1=C\underset{X'-(CH_2)_n\diagup}{\overset{\underset{|}{\overset{R_1}{N}}}{\underset{O=C}{\diagup}}}\underset{\diagdown}{\overset{N}{\diagdown}}C-COOH$$

wherein:

$R_1$ represents a phenyl group and a phenyl group condensed to form a fused ring system,
each of $L_1$, $L_2$, and $L_3$ represents a methine group,
Ar represents a phenylene nucleus or a phenylene nucleus condensed to form a fused ring system,
$p$ is 1 or 2,
$n$ is 1, 2, or 3, and
each of X and X' represents a radical selected from the group consisting of cyano, carboxyl, an alkoxycarbonyl, an aryloxycarbonyl, halogen, sulpho, amino, quaternary ammonium, and $-SO_2R_2$ wherein $R_2$ represents an alkyl group, an aralkyl group or an aryl group is described. The elements do not desensitize or fog when employed in photographic elements.

---

This invention relates to new methine dyes, to their preparation, to their use in photographic materials and to materials containing said dyes. The present invention more particularly relates to photographic silver halide materials, wherein filter dyes, antihalation dyes and/or screening dyes are used, which are easily discharged in at least one of the photographic processing liquids.

The filter dyes, antihalation dyes and screening dyes of use according to the present invention can be represented by the following general Formula I:

(I)
$$X-(CH_2)_n\diagdown N-Ar(-L_3=L_2)_{p-1}-L_1=C\underset{X'-(CH_2)_n\diagup}{\overset{\underset{|}{\overset{R_1}{N}}}{\underset{O=C}{\diagup}}}\underset{\diagdown}{\overset{N}{\diagdown}}C-COOH$$

wherein:

$R_1$ represents a phenyl group including a substituted phenyl group and a phenyl group condensed to form a fused ring system, e.g., phenyl and phenyl substituted with a lower alkyl group, a substituted lower alkyl group, an aryl group, a substituted aryl group, a hydroxyl group, an alkoxy group, a halogen atom such as a chlorine atom, a nitro group, an alkoxycarbonyl group, a carboxyl group, a cyano group, a sulpho group, an alkylsulphonyl group, a carbamoyl group, a carbonamido group, a sulphamoyl group, a sulphonamido group, an amino group, a substituted amino group, a mercapto group or an alkylthio group, each of $L_1$, $L_2$, and $L_3$ (the same or different) represents a methine group including a substituted methine group e.g. methine substituted by alkyl, aralkyl or aryl,
$p$ stands for 1 or 2,
$n$ stands for 1, 2 or 3,
Ar represents a phenylene nucleus including a substituted phenylene nucleus and a phenylene nucleus condensed to form a fused ring system, e.g., phenylene and phenylene substituted with a lower alkyl group, a substituted lower alkyl group, an aryl group, a substituted aryl group, a hydroxyl group, an alkoxy group, a halogen atom such as a chlorine atom, a nitro group, an alkoxycarbonyl group, a carboxyl group, a cyano group, a sulpho group, an alkylsulphonyl group, a carbamoyl group, a carbonamido group, a sulphamoyl group, a sulphonamido group, a mercapto group, or an alkylthio group, and each of X and X' (the same or different) represents a cyano group, a carboxyl group, a sulpho group, a halogen atom, e.g. chlorine, an alkoxycarbonyl group, e.g. methoxycarbonyl, an aryloxycarbonyl group, an amino group, a substituted amino group e.g. dimethylamino, a quaternary ammonium group, a $-SO_2R_2$ group wherein $R_2$ represents alkyl including substituted alkyl, aralkyl including substituted aralkyl or aryl including substituted aryl.

The dyes of use according to the present invention meet the severe demands that are made on antihalation dyes, filter dyes and screening dyes for photographic silver halide materials; in other words, they do not desensitize or fog a light-sensitive silver halide emulsion, are well miscible with a photographic colloid, e.g. gelatin, can easily be incorporated into the photographic material, possess an intensive tinctorial power and are discharged quickly, completely and irreversibly (particularly owing to the simultaneous presence of the groups X and X') without formation of coloured degradation products in an alkaline or acid reducing medium such as an alkaline photographic developing bath or an acid fixing bath containing sodium hydrogen sulphite.

The structural formulae of some examples of dyes corresponding to the above general formula are listed in the following table.

TABLE 1

$$NC-CH_2-CH_2\diagdown N\diagup\hspace{-0.2em}\underset{NC-CH_2-CH_2\diagup}{}\hspace{-0.2em}-CH=C\underset{}{\overset{\underset{|}{\overset{R_1(phenyl)}{N}}}{\underset{O=C}{\diagup}}}\underset{\diagdown}{\overset{N}{\diagdown}}C-COOH$$

2.

$$NC-CH_2-CH_2\diagdown N\diagup\hspace{-0.2em}\underset{NC-CH_2-CH_2\diagup}{}\hspace{-0.2em}\underset{OCH_3}{-CH=C}\underset{}{\overset{\underset{|}{\overset{N(phenyl)}{N}}}{\underset{O=C}{\diagup}}}\underset{\diagdown}{\overset{N}{\diagdown}}C-COOH$$

3.
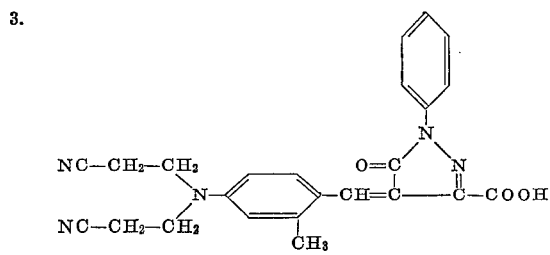

4.
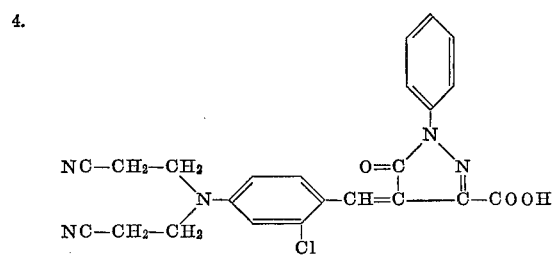

5.
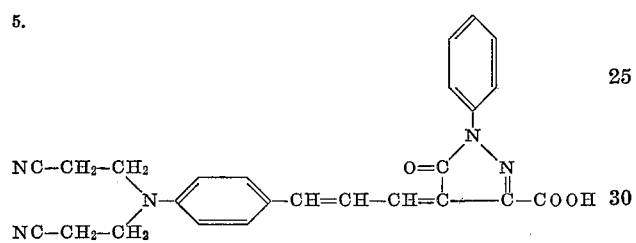

6.
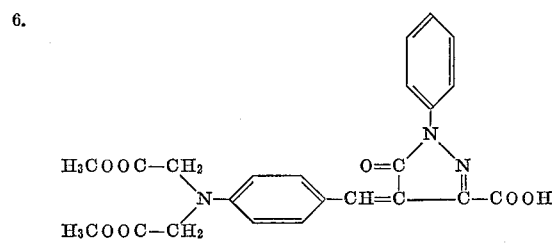

7.
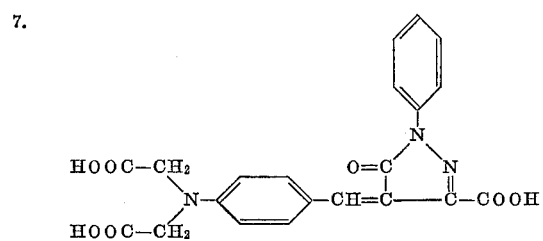

8.
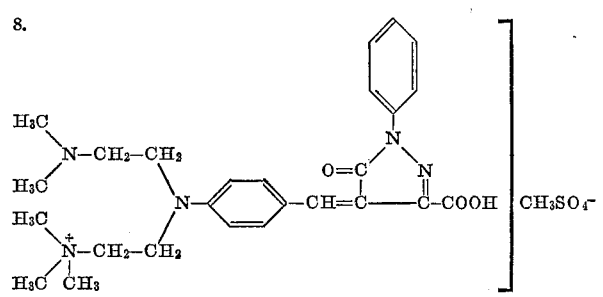

9.
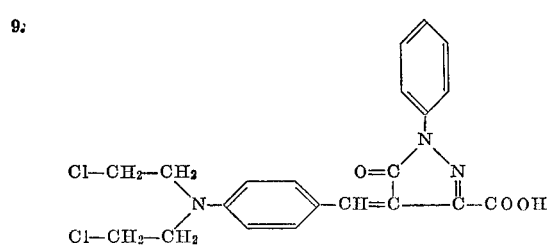

10.
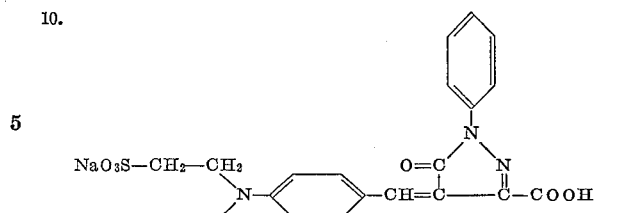

11.
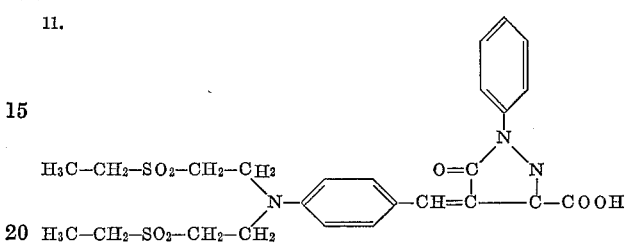

12.
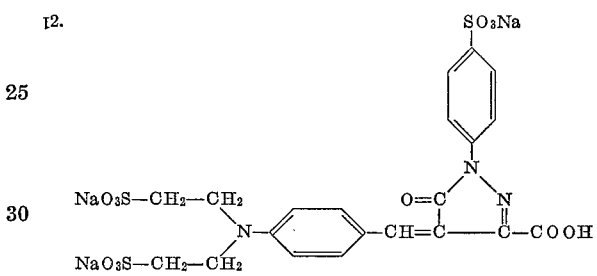

13.
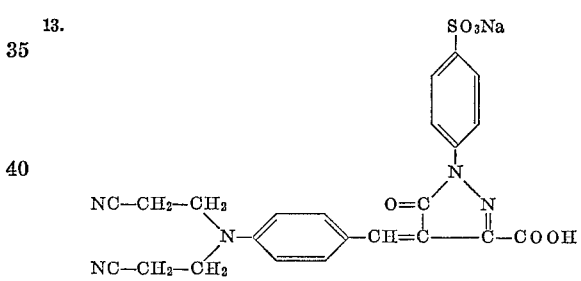

The dyes according to the present invention can be prepared by allowing to react a compound of general Formula II:

(II)
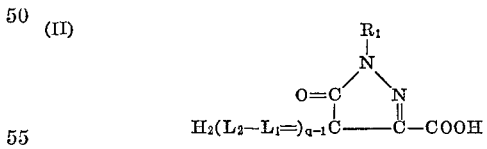

with a compound of general Formula III:

(III)
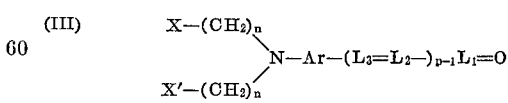

wherein $R_1$, $L_1$, $L_2$, $L_3$, Ar, X, X', $n$, and $p$ have the same significance as above and $q$ is 1 or 2 but is 1 when $p=2$.

The reaction can be carried out by heating a mixture of compounds II and III in the presence of a basic condensing agent such as sodium acetate or pyridine. The reaction can also occur in an inert diluent such as methanol, ethanol, ethylene glycol monomethyl ether, acetonitrile, dimethyl sulphoxide, tetrahydrothiophene-1,1-dioxide or dimethyl formamide, either or not in the presence of a basic condensing agent.

The intermediates of Formula II, with $q=1$, can be prepared without difficulty by known methods starting from intermediates used in dyestuff chemistry, for instance by condensation of the appropriate phenyl hydrazine with an oxalo-acetic acid ester.

The intermediates of Formula II, with $q=2$, can be obtained by condensation of a product of Formula II with $q=1$ and a dialkyl ketone, an alkyl aryl ketone, or an aliphatic aldehyde.

The aldehydes of Formula III, wherein $p=1$ can be prepared from the corresponding substituted anilines according to the Vilsmeier and Haack reaction (Ber. 60, 119, 1927) using dimethylformamide as formylating agent whereas those wherein $p=2$ can be prepared analogously to the Vilsmeier reaction, as described by C. Jutz, Ber. 91, 850 (1958), with N-methylanilinopropene(1)-al (3) and the appropriate anilines. The substituted anilines can be prepared by methods well known in organic chemistry. For instance, the substituted N,N-bis ($\beta$-cyano-ethyl)anilines were prepared by cyanoethylation, according to the method of Braunholtz and Mann, J. Chem Soc., 1953,1817 of the corresponding anilines; N,N-bis($\beta$-dimethylaminoethyl)-aniline was prepared by condensation of dimethylamine with N,N-bis($\beta$-chloroethyl)-aniline as described in French patent specification 1,240,138 and N,N-bis(methoxycarbonylmethyl)-aniline was prepared according to the method of Turitsyna, Ilinskaya, J. Gen. Chem. USSR 33, 2588 (1963).

The following preparations illustrate how the aldehydes, not prepared directly according to the method of Vilsmeier and Haack, can be obtained.

PREPARATION 1 p-N-($\beta$-dimethylaminoethyl) - N - ($\beta$ - trimethylammoniumethyl)-aminobenzaldehyde methyl sulphate having the formula:

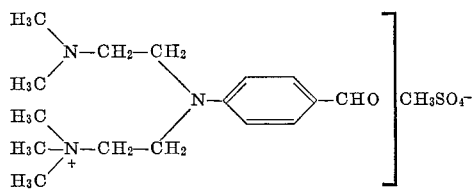

was prepared by quaternizing a solution of 5 g. of p-N,N-bis($\beta$-dimethylaminoethyl)-aminobenzaldehyde in 30 ml. of benzene by addition of 3 ml. of dimethyl sulphate. Melting point: 158–160° C.

PREPARATION 2 p-N,N-bis(carboxymethyl)-aminobenzaldehyde was prepared by hydrolysis of p-N,N-bis(methoxycarbonylmethyl)-amino-benzaldehyde by means of warm aqueous sodium hydroxide followed by acidification of the reaction mixture. Melting point: 230° C.

PREPARATION 3 p-N,N-bis($\beta$-cyanoethyl) - amino-cinnamaldehyde was prepared by a method analogous to the preparation of p-N,N-dimethylaminocinnamaldehyde described by C. Jutz, Ber. 91, 857 (1958). However, the aldehyde obtained was not purified by steam distillation but by preparative chromatography on silica gel using chloroform as eluent. The light-yellow oil remaining after evaporation of the eluate was crystallized in ethanol and washed with benzene. Melting point: 143° C.

The following illustrates how the dyes of the invention can be prepared:

PREPARATION 4

The dyestuff of Formula 6 of the above table was prepared as follows:

4 g. (0.015 mole) of N,N-bis(methoxycarbonylmethyl) aminobenzaldehyde and 3 g. (0.015 mole) of 1-phenyl-3-carboxyl-2-pyrazolin-5-one in 50 ml. of methanol were refluxed for 1 hour. Upon cooling the dye crystallized. The crystallized dye was filtered by suction and washed with ethanol. It was recrystallized from ethanol. Melting point: 215° C. Absorption maximum (in methanol acidified with hydrochloric acid): 475–477 nm. $\epsilon=3.54\times10^4$.

PREPARATION 5

The dyestuff of Formula 9 of the above table was prepared as follows:

20.4 g. (0.1 mole) of 1-phenyl-3-carboxyl-2-pyrazolin-5-one and 24.6 g. (0.1 mole) of p-N,N-bis($\beta$-chloroethyl) aminobenzaldehyde were boiled for 30 min. in 50 ml. of ethylene glycol monomethylether whereby the products dissolved. Upon cooling of the reaction mixture the dyestuff crystallized. The dyestuff was recrystallized from butanol. Melting point 204° C. Absorption maximum (in methanol): 465 nm. $\epsilon=3.02\times10^4$.

PREPARATION 6

The dyestuff of Formula 10 of the above table was prepared as follows:

4.08 g. (0.02 mole) of 1-phenyl-3-carboxyl-2-pyrazolin-5-one and 8.9 g. (0.02 mole) of p-N,N-bis(2-sulphoethyl) aminobenzaldehyde disodium salt were boiled for 5 hours in 75 ml. of pyridine and 25 ml. of water. Then the solvents were distilled off under reduced pressure. The residue was extracted with boiling methanol and the solution was filtered while warm. The dyestuff that crystalized upon cooling was filtered off, washed with ether and dried. Melting point: aobve 260° C. Absorption maximum (in methanol): 480–484 nm. $\epsilon=2.90\times10^4$.

PREPARATION 7

The dyestuff of Formula 13 of the above table was prepared as follows:

4.4 g. (0.015 mole) of 1-p-sulphonyl-3-carboxyl-2-pyrazolin-5-one, 3.4 g. (0.015 mole) of p-N,N-bis($\beta$-cyanoethyl)aminobenzaldehyde and 2.1 g. (0.015 mole) of sodium acetate-3-water were mixed thoroughly and heated to 165° C. on an oil bath. In the beginning the reaction mixture melted but after some 20 min. it became solid again. Then, the reaction mixture was allowed to cool and pulverised. The powder was washed with acetone and ether. Absorption maximum (in methanol): 453 nm. $\epsilon=2.11\times10^4$.

The absorption characteristics of dyestuffs prepared in an analogous way as the dyes of the above preparations are listed in the following table.

TABLE 6

| Dyestuff of formula | Absorption maximum (nm.) | $\epsilon$ |
| --- | --- | --- |
| 1 | [1] 445–450 | $2.81\times10^4$ |
| 2 | [2] 485–495 | $2.48\times10^4$ |
| 3 | [2] 483–497 | $2.14\times10^4$ |
| 4 | [2] 470–486 | $2.82\times10^4$ |
| 5 | [1] 500–515 | $4.13\times10^4$ |
| 7 | [2] 472–482 | $2.79\times10^4$ |
| 8 | [2] 482–492 | $3.97\times10^4$ |
| 11 | [3] 474–478 | $3.40\times10^4$ |
| 12 | [1] 480 | $1.67\times10^4$ |

[1] Measured in methanol.
[2] Measured in methanol acidified with hydrochloric acid.
[3] Measured in ethylene glycol monomethyl ether.

The dyestuffs according to the invention can be applied in any photographic material based on light-sensitive silver halide, when easily dischargeable dyestuffs are desired or necessary. Examples of applications of these dyes are: in an antihalation layer e.g. between the support and a light-sensitive silver halide emulsion layer or at the backside of the support, in a filter layer above or between the light-sensitive silver halid emulsion layers or as screening dye in a light-sensitive silver halide emulsion layer do not or practically do not decrease the inherent and/or spectral sensitivity of the silver halide.

The dyes according to the present invention can be incorporated into a photographic material according to any technique known to those skilled in the art. The following is a mere description of some appropriate techniques and has no intention of limiting the scope of the invention.

An alkali salt of a dye according to the present invention is dissolved in water, whereupon the solution obtained is dispersed, occasionally in the presence of a wetting agent, in a hydrophilic colloid composition, preferably a gelatin solution. With a mixture so obtained, layers can be coated in which, in most cases, the dye is not fast to diffusion.

Layers with broad spectral absorption, in which the dye is fast to diffusion, can be obtained, provided the dye contains no sulphonic acid group, when one equivalent of a water-soluble acid, e.g., hydrochloric acid or acetic acid, or one equivalent of a water-soluble salt, which forms water-insoluble salts with the dye, e.g. silver nitrate or lead nitrate, is added to the hydrophilic colloid composition before, during or after the addition of the aqueous solution of the alkali salts of the dyes.

The dyes according to the present invention that contain no sulphonic acid group can also be incorporated in a form fast to diffusion and with broad spectral absorption, when using a dispersion of said dye in a hydrophilic colloid, obtained in one of the following ways:

(a) A solution of the dye, in its free carboxylic acid form, in a suitable organic water-miscible and/or water-immiscible solvent, is dispersed in a hydrophilic colloid solution, preferably an aqueous gelatin solution, occasionally in the presence of a wetting agent. For more details about such dispersing techniques, there can be referred to published Dutch patent applications 6,516,423, 6,600,098, 6,600,628, 6,600,099, 6,416,424 and 6,714,713, to U.S. patent specification 2,304,940 and to United Kingdom patent specification 791,219;

(b) A suspension of the dye in water is finely ground in a mill, e.g. a colloid ball mill, occasionally in the presence of a wetting agent, the hydrophilic colloid can be added before or after the milling process.

The colloids or mixtures of colloids used in the hydrophilic colloid compositions, into which the dyes are dispersed, may be of any type as commonly used in photographic materials, e.g., gelatin, casein, polyvinyl alcohol, poly-N-vinyl pyrrolidone, carboxymethylcellulose, sodium alginate, etc., gelatin being however favoured. Before coating, other ingredients, such as coating aids and hardening agents, may be added to the dye dispersions.

The following examples illustrate more particularly the use of the dyes according to the present invention.

EXAMPLE 1

30 g. of the dyestuff having structural Formula 1 is dissolved in 270 ml. of N-methyl-pyrrolidone whereupon the solution is obtained is added while stirring to a solution of 54 g. of inert gelatin and 2 g. of sodium isopropyl naphthalene sulphonic acid in 900 ml. of water.

The dispersion obtained is gelled, noodled, washed, and aftertreated in an ultra sound field.

A coating solution of the following composition is prepared:

dispersion just described—190 g.
inert gelatin—45 g.
4% formaldehyde—1.1 ml.
saponine—1 g.
distilled water to make 1000 g.

The solution obtained having a pH of 5.8, is coated on a subbed cellulose triacetate support in such a way that 470 mg. of the dyestuff are present per sq. m.

An intense yellow layer is obtained, the absorption characteristics of which are represented in FIG. 1.

In a similar way, coating solutions are prepared with the dyestuffs having structural Formulae 2, 3 and 4 respectively. The absorption maxima of the gelatin layers formed are 475 nm., 480 nm. and 470 nm. respectively.

EXAMPLE 2

Figure 2:
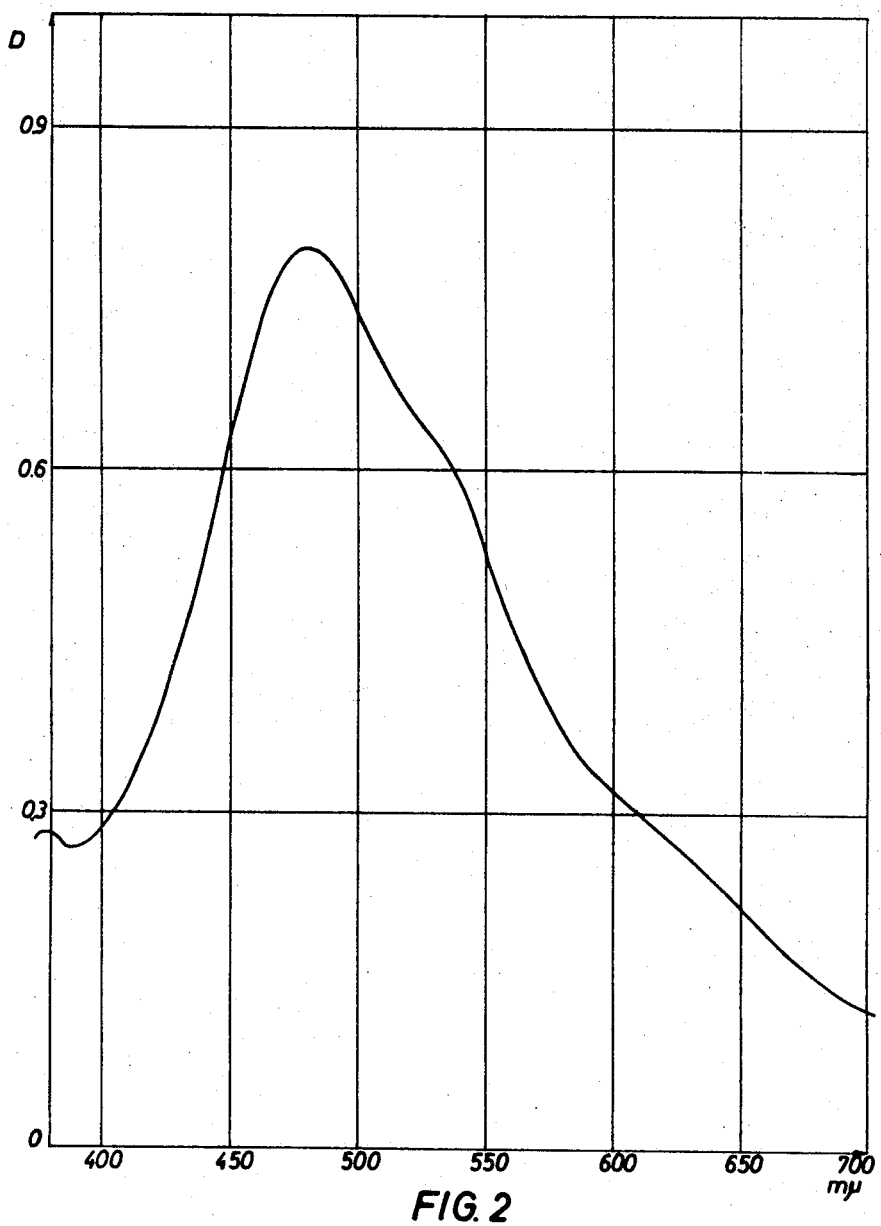

The following composition:

dyestuff having structural Formula 5—20 g.
inert gelatin—40 g.
sodium oleyl methyl taurine—5 g.
water to make 2000 ml.

is ball-milled and after a treatment of 12 hours the dispersion obtained is mixed with a solution of 360 g. of inert gelatin in 38 litres of water. The solution having a pH of 6.0 is coated on a subbed polyethylene terephthalate support pro rate of 50 g./sq. m. so that 0.25 g. of dyestuff and 5 g. of gelatin are present per sq. m. The spectral absorption characteristics of the layer formed are represented in FIG. 2.

EXAMPLE 3

25 g. of the dyestuff having structural Formula 11 is dissolved in a mixture of 37.5 ml. of dimethyl sulphoxide and 75 ml. of ethyl acetate.

With stirring, the dyestuff solution is added to 620 ml. of a solution of 31.25 g. of gelatin and 3.125 g. of disodium 2-heptadecyl-benzimidazole disulphonic acid in demineralized water. Thereupon the ethyl acetate is evaporated under reduced pressure. After cooling the gel obtained is noodled and washed.

A coating solution of the following composition is prepared:

dyestuff dispersion just described—167.5 g.
inert gelatin—45 g.
4% formaldehyde—1.1 ml.
saponine—1 g.
demineralized water to make 1000 g.

The solution obtained having a pH of 6.0 is coated on a subbed cellulose triacetate support in such a way that 520 mg. of the dyestuff are present per sq. m.

Figure 3:
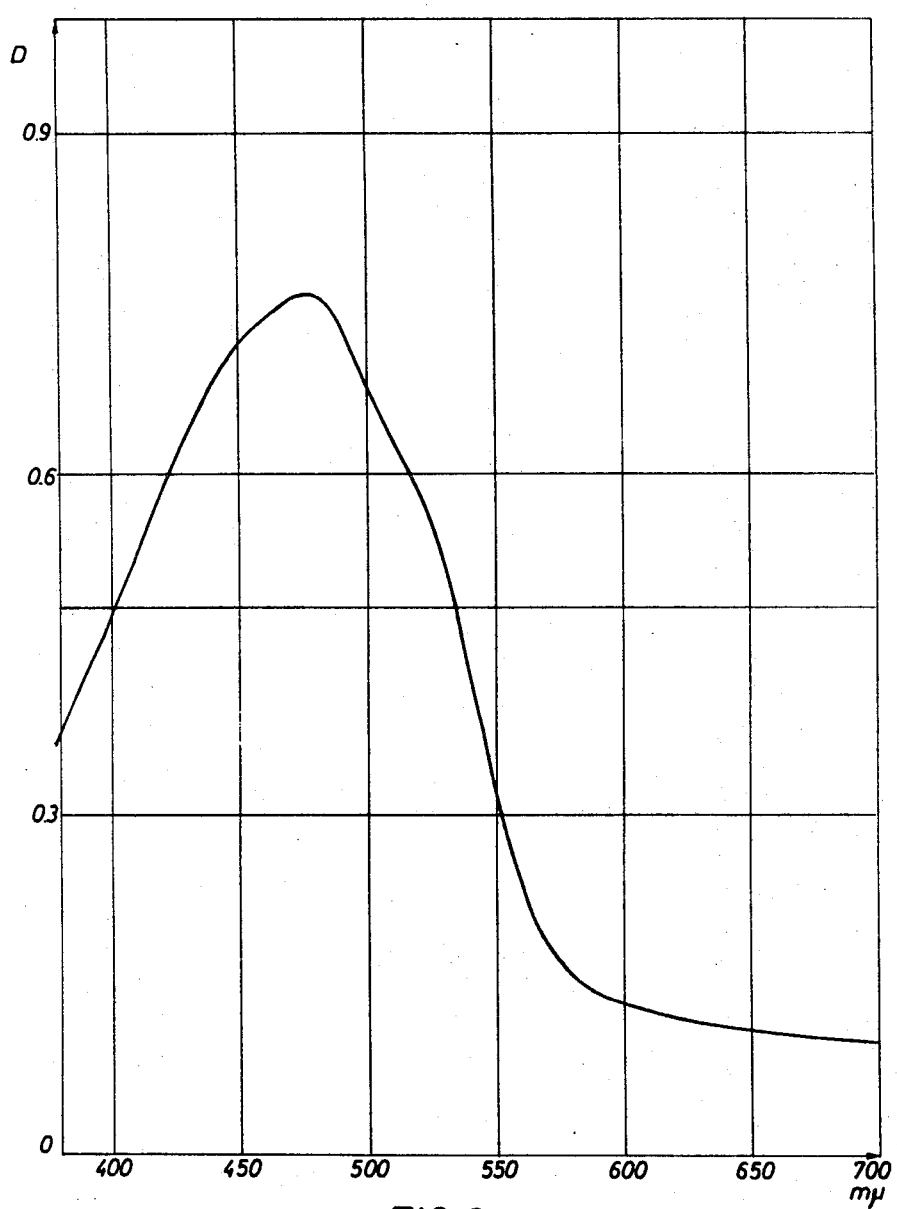

An intense yellow layer is obtained, the absorption characteristics of which are represented in FIG. 3.

We claim:

1. A light-sensitive element comprising a support, a light-sensitive material, and at least one water-permeable colloid layer containing a dye corresponding to the formula:

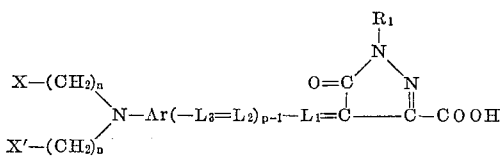

wherein:

$R_1$ represents a phenyl group and a phenyl group condensed to form a fused ring system,
each of $L_1$, $L_2$, and $L_3$ represents a methine group,
Ar represents a phenylene nucleus or a phenylene nucleus condensed to form a fused ring system,
$p$ is 1 or 2,
$n$ is 1, 2, or 3, and
each of X and X' represents a radical selected from the group consisting of cyano, carboxyl, an alkoxycarbonyl, an aryloxycarbonyl, halogen, sulpho, amino, quaternary ammonium, and —$SO_2R_2$ wherein $R_2$ represents an alkyl group, an aralkyl group or an aryl group.

2. A light-sensitive element according to claim 1 wherein the said water-permeable colloid layer containing the said dye is an anti-halation layer coated either on the back of the support or between the support and a light-sensitive silver halide emulsion layer.

3. A light-sensitive element according to claim 1 including at least one light-sensitive silver halide emulsion layer.

4. A light-sensitive element according to claim 1 wherein said layer is part of a light-sensitive photographic multi-layer silver halide color material and functions as filter layer or anti-halation layer.

5. A light-sensitive element according to claim 1 wherein said layer is a light-sensitive silver halide emulsion layer forming a part of a photographic silver halide material.

6. A light-sensitive element according to claim 1 wherein the light-sensitive material is including in said water-permeable colloid layer.

References Cited

FOREIGN PATENTS 596,917   8/1959   Italy.

RONALD H. SMITH, Primary Examiner

U.S. Cl. X.R.

260—240.9